(12) United States Patent
Fofana et al.

(10) Patent No.: US 10,941,322 B2
(45) Date of Patent: Mar. 9, 2021

(54) RELEASE LINER

(71) Applicant: Lohmann GmbH & Co. KG, Neuwied (DE)

(72) Inventors: Renate Fofana, Neuwied (DE); Ralf Gerhards, Neuwied (DE); Alexander Krauss, Furth (DE); Thomas Weber, Baunach (DE)

(73) Assignee: Lohmann GmbH & Co, KG, Neuwied (DE)

( * ) Notice: Subject to any disclaimer, the term of this patent is extended or adjusted under 35 U.S.C. 154(b) by 0 days.

(21) Appl. No.: 15/748,903

(22) PCT Filed: Jul. 19, 2016

(86) PCT No.: PCT/DE2016/000280
§ 371 (c)(1),
(2) Date: Jan. 30, 2018

(87) PCT Pub. No.: WO2017/016532
PCT Pub. Date: Feb. 2, 2017

(65) Prior Publication Data
US 2018/0215962 A1    Aug. 2, 2018

(30) Foreign Application Priority Data

Jul. 30, 2015    (DE) .......................... 102015011489.1

(51) Int. Cl.
*C09J 7/40*    (2018.01)
*B32B 7/06*    (2019.01)
*B32B 7/12*    (2006.01)

(52) U.S. Cl.
CPC ................. *C09J 7/403* (2018.01); *B32B 7/06* (2013.01); *B32B 7/12* (2013.01); *B32B 2250/05* (2013.01); *B32B 2307/748* (2013.01); *B32B 2405/00* (2013.01); *Y10T 428/14* (2015.01)

(58) Field of Classification Search
CPC ... C09J 7/403; B32B 7/06; B32B 7/12; B32B 2307/748; B32B 2250/05; B32B 2405/00; Y10T 428/14
See application file for complete search history.

(56) References Cited

U.S. PATENT DOCUMENTS

| | | | |
|---|---|---|---|
| 2005/0084641 A1* | 4/2005 | Downs ................... | B42D 5/002 428/42.3 |
| 2007/0016123 A1 | 1/2007 | Jensen | |
| 2012/0064810 A1 | 3/2012 | Yamamoto | |

FOREIGN PATENT DOCUMENTS

| | | |
|---|---|---|
| DE | 2051438 A1 | 4/1971 |
| EP | 1967563 A1 | 9/2008 |
| EP | 2599845 B1 | 6/2013 |
| EP | 2603567 B1 | 6/2013 |
| FR | 2912755 A3 | 8/2008 |
| GB | 1315516 A | 5/1973 |

(Continued)

OTHER PUBLICATIONS

Machine Translation of WO 2009/069576 A1. (Year: 2009).*

(Continued)

*Primary Examiner* — Patricia L. Nordmeyer
(74) *Attorney, Agent, or Firm* — Ohlandt, Greeley, Ruggiero & Perle, LLP

(57) ABSTRACT

The invention relates to the multi-layered design of a release liner for an adhesive tape, said liner simultaneously serving as a handling aid.

6 Claims, 1 Drawing Sheet

(56) References Cited

FOREIGN PATENT DOCUMENTS

Figure 1:
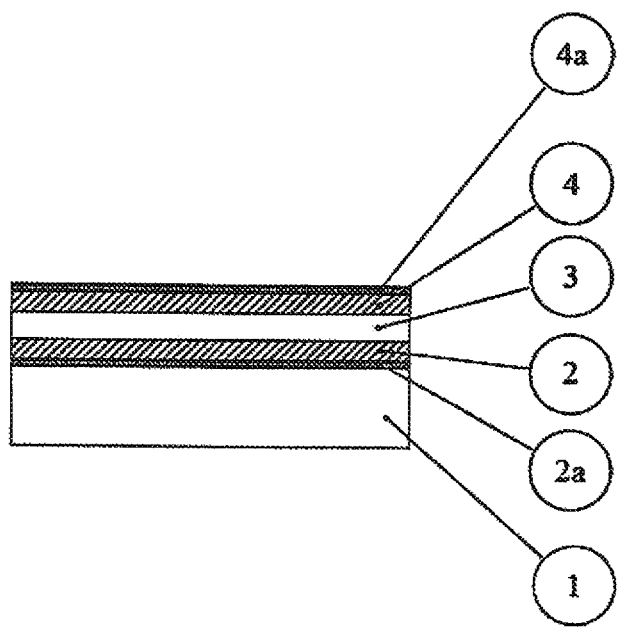

| | | |
|---|---|---|
| WO | 2005111166 A2 | 11/2005 |
| WO | 2007041599 A1 | 4/2007 |
| WO | 2009069576 A1 | 6/2009 |
| WO | 2014202283 A2 | 12/2014 |

OTHER PUBLICATIONS

International Search Report Issued in PCT/DE2016/000280 dated Jan. 25, 2017, and English language translation.
German Office Action for corresponding German application No. 10 2015 016 744.8, 8 pages, dated Feb. 12, 2020.

* cited by examiner

RELEASE LINER

The present invention concerns the particular design of a release liner system for adhesive agents, such as for example punched parts, adhesive strips or sticking plaster-like products, and in particular for adhesive tapes.

In order for adhesive tapes to be able to be rolled up, it is necessary to treat the sticky side(s) such that they do not deploy their adhesion before their intended use. Normally, to this end so-called release liners are used, i.e. separating papers or cover materials which can easily be removed from the adhesive surface before use of the adhesive tape. These release liners may be made from widely varying materials; sometimes they are treated before use with a non-stick coating, i.e. a corresponding silicone treatment, so they can be released more easily from the adhesive surface and no adhesive residue remains thereon. One of the problems with detaching the release liner from the adhesive surface lies in finding the start of a liner and then removing this cleanly from the adhesive surface. The present invention now describes a product and a method for easier removal of a release liner from the adhesive surface of an adhesive strip or also a punched part.

Previously, attempts have been made to solve this problem, but in particular for an adhesive tape, these approaches have proved less than satisfactory. EP 2603567 B1 and also EP 2599845 B1 for example describe a method for production of an adhesive tape with protruding liner. The protrusion here serves as a type of handling tab which allows easier gripping of the liner and, hence, better detachment from the adhesive surface. At the same time, such a protruding liner solves a further problem, namely that of the side edge stickiness, which can mean that a roll of adhesive tape placed with its flat side on a substrate may have a tendency to adhere to the substrate undesirably because of the contact; this is a particular problem with transport and storage of adhesive tape rolls and requires the use of a non-stick separating layer. Also, the risk that the rolled layers of a roll of adhesive tape will stick together and hence prevent clean unrolling of the tape is significantly minimised by a liner protruding over the adhesive surface. The essential disadvantage of such solutions lies in the complex production of such coverings on corresponding adhesive surfaces.

A further possibility is offered by a structured release liner which has reduced adhesion in parts, and therefore can be lifted more easily from the adhesive surface in these zones of reduced adhesion, as described in a similar form in WO 2014/202283 A2 and also in WO 2007/941599 A1. Even as handling aids possible at every place on the adhesive tape such structured liners are not satisfying.

Other possible solutions, in particular for defined portions of adhesive tapes such as sticking plasters with wound pads, are for the liner to consist of two portions which overlap over the non-sticky wound pad so that the respective ends of both portions constitute easily grippable handling aids for the two liner parts, as disclosed in US 2007/0016123 A1. Similarly, a single continuous liner can easily be detached from the adhesive surface if the plaster is bent slightly, such that the liner lifts away from the wound pad and so can again be easily gripped and removed. Finger lifts in various designs, perforations and other forms of weakening lines are further auxiliary structures which in the present context are both described in the literature and present in products as claimed for example in EP 2599845 B1.

Finally, there are also methods in which a relatively rigid liner is used slightly lifting away from the adhesive surface in the manner of a dispenser edge when unrolling sticky segments of a roll, and thus allowing easy gripping and detachment of the liner portion concerned.

None of the variants found however offers a truly satisfactory solution as a handling aid for a liner which can be produced and applied in a simple fashion as a cover on an adhesive tape rolled on itself.

This solution claimed herein comprises two liners, each having a non-stick treatment on one side only, which are laminated together by means of an adhesive on their non-sticky surfaces, wherein the adhesive is not applied over the entire surface area but is structured in a certain fashion, such as in an interrupted strip transversely to the longitudinal direction of an adhesive tape, i.e. finally creating a single liner with a plurality of layers: the two layers (2 and 4) towards the surface (1) fully coated with adhesive each have a non-stick treatment (2a and 4a), e.g. by means of silicone treatment, and the two layers lying opposite the non-stick layers are each formed without non-stick treatment, so that in parts they can be permanently connected together by means of adhesive (3). This adhesive connection of the two liners must be stronger than the adhesion of the non-stick liner surfaces (2a and 4a) to the surface (1) fully coated with adhesive. Because the adhesion (3) of the two liners (2 and 4) on top of each other does not occur over the full surface area, adhesive-free zones are present at certain intervals which then serve as handling aids. The wider these adhesive-free zones are, the more easily they can be gripped and lifted.

Depending on the condition of the liners, another possibility for interconnecting the two liners (2 and 4) is possible: instead of an adhesion (3), the connection can also be realized by a hot sealing or welding process. The structuring of the adhesive application for the present purpose may be different from the interrupted strip (3) transverse to the longitudinal direction of the tape; here, many geometric designs are possible. In the final effect however, all must lead to adhesive-free zones between the two liners in order to be able to serve as handling aids in the sense of the inventive concept.

Before application of an adhesive tape equipped with such a liner system, the liner (4) lying remote from the surface (1) fully coated with adhesive can be gripped easily at one of the adhesive-free zones, and it is then detached from the surface fully coated with adhesive. Because the adhesion of the two liners (2 and 4) to each other is greater than the adhesion to the adhesive (1), the liner (2) covering the adhesive is simultaneously detached or at least "lifted" so that it can easily be gripped and removed.

Suitable lining materials here are in principle all conventional materials which fulfil the desired properties, e.g. in terms of tear strength or tensile strength, i.e. papers or films in any pure form or also in coated, vapour-deposited or film form. The liner system may consist of two identical liner materials or also of a combination of different materials.

Paper liners normally consist of glassine or kraft paper; in terms of films, the liner materials are normally made of polyethylene, polypropylene, polyester or PVC. These materials may be used both in pure form and as blends of different materials.

There are no restrictions with regard to the type of adhesive for either the adhesive fully coating the surface or for the adhesive applied in a structured pattern, and in principle all conventionally known types of adhesive may be used; the same adhesive may be used in both cases but also different adhesives may be used.

Adhesive tapes equipped with the liner system according to the invention are produced using one of the conventional and generally known production methods.

Figure 2:
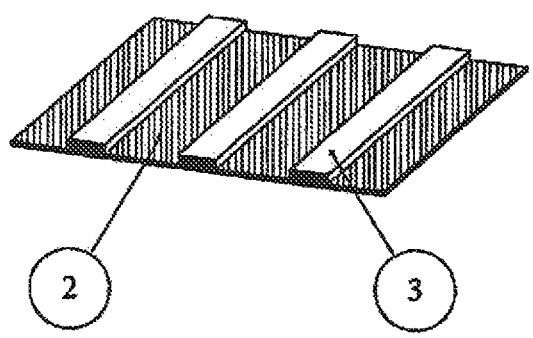

The liner system according to the invention is explained in more detail with reference to the figures. FIG. 1 shows the various layers of the liner system in cross-section. FIG. 2 is a top view of liner 2 with the adhesive applied thereon in an interrupted strip pattern.

LEGEND TO THE FIGURES

1: Surface fully coated with adhesive
2: Liner 1
2a: Non-stick side of liner 1
3: Structured adhesive application
4: Liner 2
4a: Non-stick side of liner 2

The invention claimed is:

1. A release liner for double sided adhesive agents for adhesive tape that can be rolled on itself, the release liner comprising a composite of two liners creating a single liner with a plurality of layers, each of the two liners having a first surface without a non-stick treatment and a second surface with a separate non-stick treatment, the two liners being permanently connected by an adhesive coating that covers a part of each first surface of the two liners in a pattern creating a plurality of adhesive-free zones and adhesive covered zones between the two liners, the plurality of adhesive free zones connecting the two liners being spaced at intervals in order to form handling aids,
   wherein an adhesive agent is fully coated on the second surface with the non-stick treatment, and
   wherein an adhesion of the two liners adhered to each other by the adhesive coating is greater than an adhesion of the two liners to the adhesive agent on the second surface.

2. Release liner according to claim 1, wherein the adhesive coating that does not cover the entirety of each first surface is configured as an interrupted strip transverse to a longitudinal direction of the adhesive agent to form the adhesive-free zones and the adhesive-covered zones.

3. Release liner according to claim 1, wherein the liners are homogeneous in material.

4. Release liner according to claim 1, wherein the liners consist of different materials.

5. The release liner of claim 1, wherein the separate non-stick treatment comprises silicone.

6. A method for removing the release liner of claim 1 from an adhesive agent:
   providing an exposed first liner of the release liner adapted to be gripped and pulled upward at an adhesive-free zone of the release liner, whereby a second liner covering the adhesive agent and partially connected to the exposed first liner is detached from the adhesive agent when the release liner is lifted.

* * * * *